Figure 1:
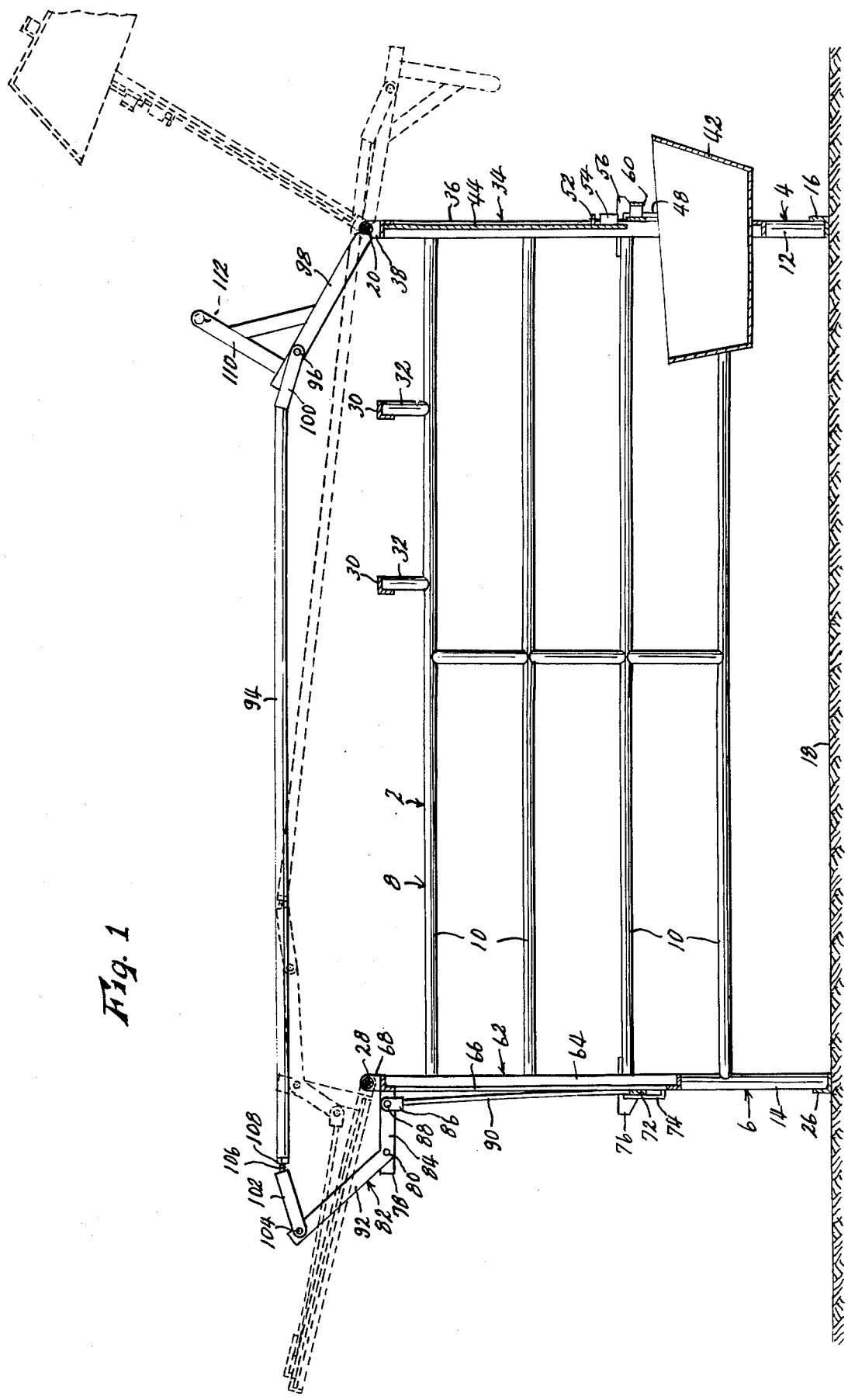

United States Patent [19]

Nickel

[11] 4,129,096

[45] Dec. 12, 1978

[54] SOW FEEDING ENCLOSURE

[76] Inventor: Lonnie L. Nickel, Rte. #1, Tampa, Kans. 67483

[21] Appl. No.: 757,658

[22] Filed: Jan. 7, 1977

[51] Int. Cl.² ............................................. A01K 1/02
[52] U.S. Cl. ..................................................... 119/27
[58] Field of Search ................................. 119/27, 20

[56] References Cited

U.S. PATENT DOCUMENTS

| | | | |
|---|---|---|---|
| 1,116,220 | 11/1914 | Betty | 119/27 X |
| 3,412,711 | 11/1968 | Martensson et al. | 119/20 |
| 3,415,227 | 12/1968 | Welsh | 119/27 |
| 3,473,515 | 10/1969 | Atchinson, Sr. | 119/27 |

Primary Examiner—Louis G. Mancene
Assistant Examiner—Daniel J. Leach
Attorney, Agent, or Firm—John A. Hamilton

[57] ABSTRACT

A sow feeding enclosure consisting of a structure providing a plurality of side-by-side stalls each accommodating one sow, and each having a rear door providing ingress for the sow, and a front door providing egress for the sow, a feed bunker being attached to the front door to be swung out of the way when the front door is opened. Both the front and rear doors may be manually unlocked and opened, or closed and locked, by an operator positioned in front of the stalls.

5 Claims, 10 Drawing Figures

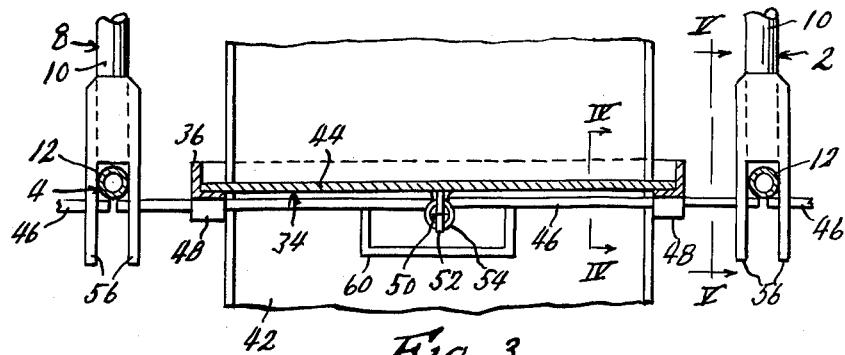
Fig. 3
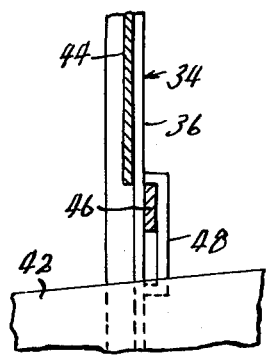
Fig. 4
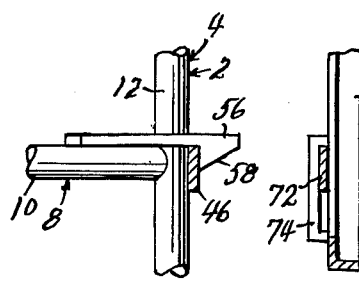
Fig. 5   Fig. 7
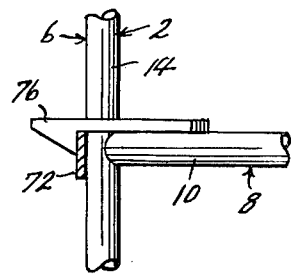
Fig. 8
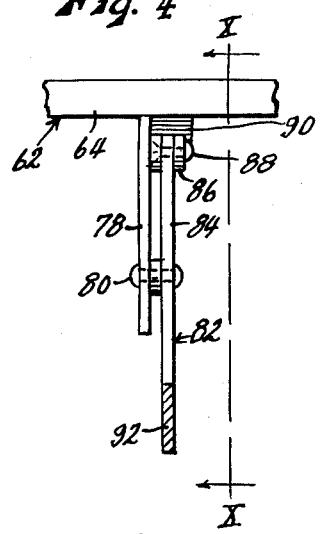
Fig. 9
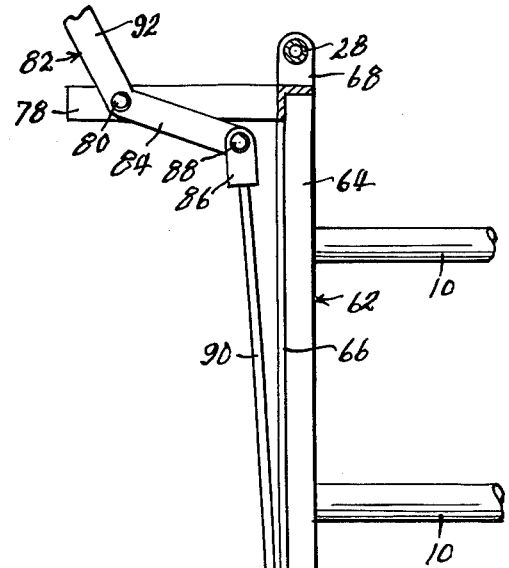
Fig. 10
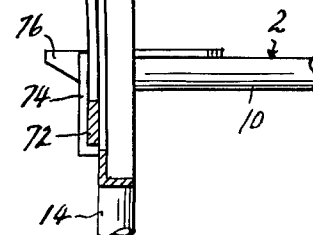

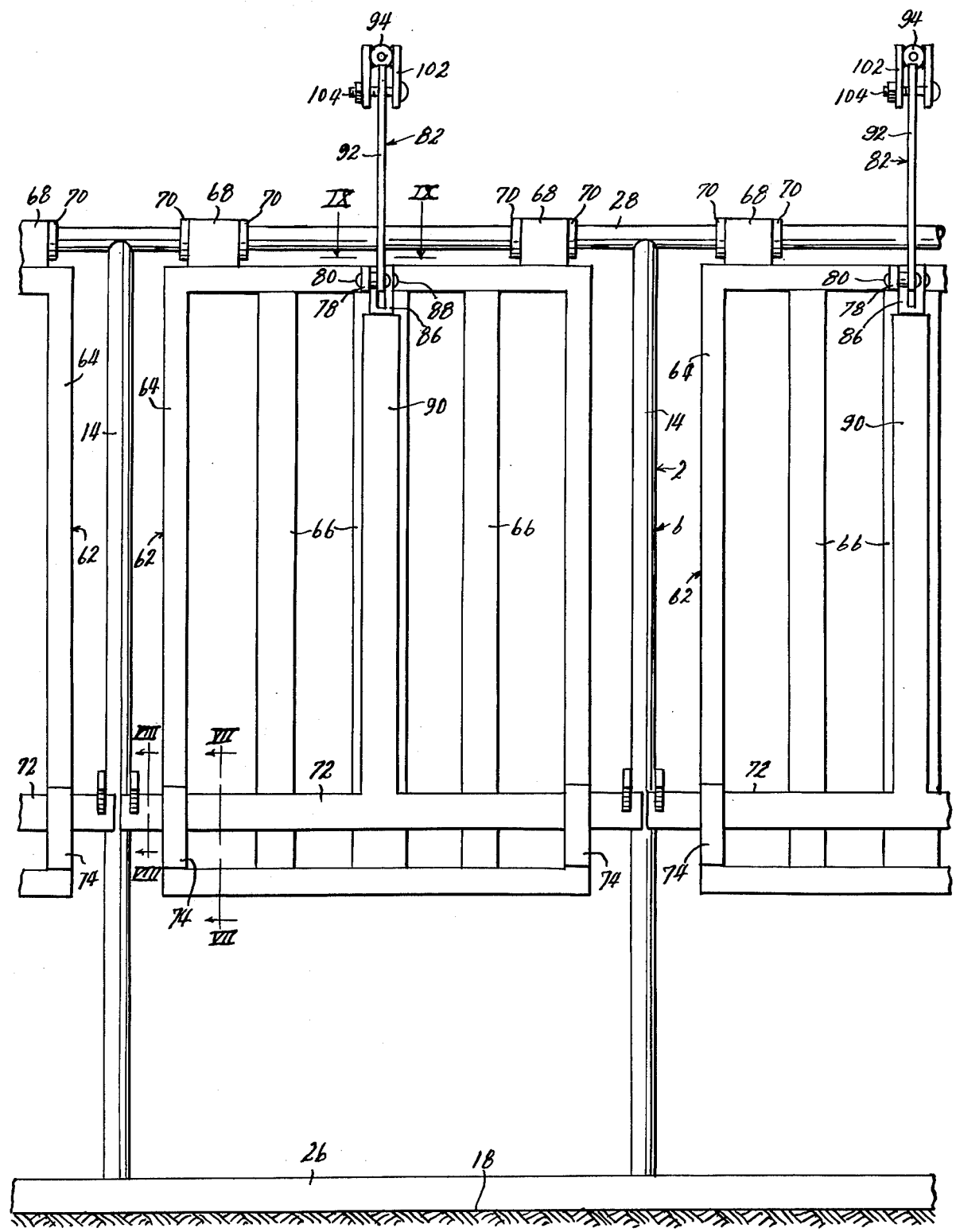

SOW FEEDING ENCLOSURE

This invention relates to new and useful improvements in feeding enclosures for sows, and has as its object the provision of a feeding enclosure which provides solutions for certain difficulties commonly encountered in the feeding of sows.

Usually, and even more especially when the sows are about to give birth to a litter pigs, it is desirable that they be fed carefully controlled individual rations, and for this reason the ration for each sow may be placed in an individual feed bunker. However, a sow will often, after finishing her own ration, push other sows aside to gain access to other bunkers, with the result that some are overfed and others underfed. Moreover, placing the bunkers in individual stalls often does not solve the problem, since if a sow is fed her ration and is allowed to leave her individual stall, she may find her way into another stall, unless some means is devised to prevent it.

Accordingly, the present invention comprises a feeding enclosure providing a series of side-by-side stalls, each having both front and rear doors both of which may be closed and locked. A sow is admitted to a stall through the open rear door thereof, while the front door is locked, and the rear door then closed and locked. After feeding, the front door is unlocked and opened, permitting forward egress of the sow. The feed bunker is affixed to the front door, so as to be swung out of the path of the sow when said door is opened. This "straight-through" travel of the sows through the stalls permits the sows to enter the stalls through a runway from a general pen providing access to the rear of all the stalls. As the feeding is completed and the sows emerge through the front doors, they may be retained in a suitable holding pen until all have been fed, thus avoiding double feeding of any of the animals.

Another object is the provision of a sow feeding enclosure of the character described wherein all of the doors may be opened or closed, and locked or unlocked, by a human operator positioned in front of the stalls. In the case of the rear doors, this involves a single lever operable both to unlock and open, or to close and lock, said doors.

Other objects are simplicity and economy of construction, and efficiency, dependability and convenience of operation.

Figure 2:
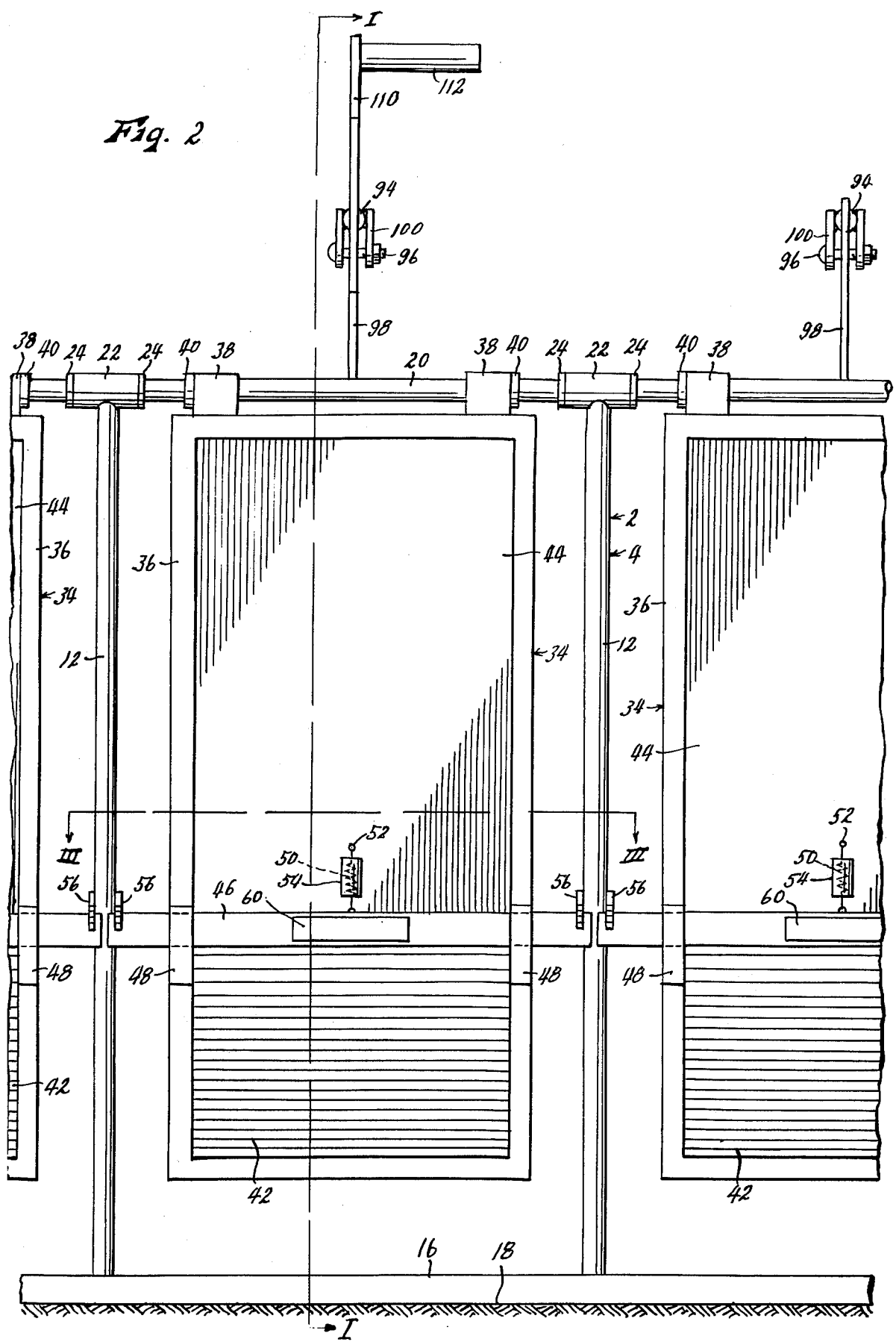

With these objects in view, as well as other objects which will appear in the course of the specification, reference will be had to the accompanying drawing, wherein:

FIG. 1 is a front-to-rear vertical sectional view of a sow feeding enclosure embodying the present invention, being a reduced sectional view taken generally on line I—I of FIG. 2, showing the front and rear doors of a stall closed and locked in solid lines, and open in dotted lines, FIG. 2 is a fragmentary front elevational view of the feeding enclosure, with the front doors closed and locked, showing one full stall and portions of the adjoining stalls, FIG. 3 is a fragmentary sectional view taken on line III—III of FIG. 2, FIG. 4 is a fragmentary sectional view taken on line IV—IV of FIG. 3, FIG. 5 is a fragmentary sectional view taken on line V—V of FIG. 3, FIG. 6 is a fragmentary rear elevational view of the feeding enclosure with the rear doors closed and locked, showing one full stall and portions of the adjoining stalls, FIG. 7 is a fragmentary sectional view taken on line VII—VII of FIG. 6, FIG. 8 is a fragmentary sectional view taken on line VIII—VIII of FIG. 6, FIG. 9 is a fragmentary sectional view taken on line IX—IX of FIG. 6, and FIG. 10 is a fragmentary sectional view taken on line X—X of FIG. 9, showing a rear stall door closed but with its operating mechanism positioned to unlock said door.

Like reference numerals apply to similar parts throughout the several views, and the numeral 2 applies generally to the frame of an enclosure embodying the present invention. Said frame includes a front wall 4, rear wall 6, both vertically disposed, and a series of vertical divider walls 8 extending between said front and rear walls to divide the interior of the frame into a series of side-by-side stalls each adapted to accommodate one sow. Each wall 8, as best shown in FIG. 1, comprises a series of horizontally extending, vertically spaced apart pipes 10 extending between and permanently affixed to a vertical front post 12 and a vertical rear post 14. Front wall 4 comprises all of front posts 12, an angle iron 16 to which the lower ends of posts 12 are affixed and which rests on the ground 18, and a horizontal shaft 20 carried at the upper ends of posts 12, being journalled rotatably in bearings 22 carried at the upper ends of said posts, and being prevented from moving axially in said bearings by collars 24 affixed to said shaft at each side of each of said bearings. Rear wall 6 includes rear posts 14, a ground-supported angle iron 26 to which the lower ends of said posts are affixed, and a horizontal bar 28 extending along and being fixed to the upper ends of posts 14. Thus frame 2 provides a series of side-by-side stalls, open at both front and rear, into each of which a sow may enter from the rear, and leave from the front, as will appear. It will be understood that the number of stalls to be included in each frame is optional, a practical limit being a number the rear doors of which may be simultaneously opened by the manual operating mechanism to be described. Shown in FIG. 1 are a pair of angle irons 30 which extend transversely above all of the stalls of the frame, and are affixed to the topmost pipes of each divider wall 8 by posts 32. These angle irons prevent sows from climbing out of the tops of the stalls.

Each stall is provided with a front door indicated generally by the numeral 34. Said door is rectangular and is normally disposed between the front frame posts 12 defining the front opening of the corresponding stall. The door includes an angle iron frame 36 pivoted at its upper edge on shaft 20 by tubular bearings 38 affixed to the door frame and journalled on said shaft, said bearings being prevented from moving axially along said shaft by collars 40 affixed to the shaft adjacent the bearings. Permanently affixed in the lower portion of door frame 36 is an upwardly opening feed bunker 42, said bunker extending both inside the plane of the door for feeding access thereto by a sow within the stall, and outside the plane of the door for easy filling by a human attendant. The bunker, and the lower edge of the door 34, are spaced sufficiently above frame angle iron 16 to permit said door to be opened outwardly and upwardly by pivoting it on shaft 20, as shown in dotted lines in FIG. 1. The portion of the door frame 36 above bunker 42 is covered by a sheet metal plate 44, it having been found that a sow will feed more efficiently if her forward vision is obstructed.

Each front door 34 may be locked by means of a horizontal lock bar 46 extending across the outer surface of door 34 just above the level of bunker 42. Said lock bar is carried for limited vertical sliding movement by a pair of slide loops 48 fixed respectively to the opposite sides of door frame 36, and extends laterally from the door in both directions to overlap the adjacent front posts 12 of the enclosure frame. It is biased upwardly by a tension spring 50 connected at its lower end to the midpoint of the lock bar, and at its upper end to a pin 52 fixed to door plate 44. The midportion of said spring is protected within a tubular shield 54 affixed to plate 44. The lock bar is biased upwardly by said spring to urge its ends into engagement with upwardly notched keepers 56 affixed to front frame posts 12, whereby to secure the door in a closed and locked position as shown in solid lines in FIG. 1. As best shown in FIG. 5, the lower front portion of each keeper 56 is bevelled as indicated at 58, whereby when the door is moved to its closed position, the bevels 58 engage and cam lock bar 46 downwardly against spring 50 to allow said lock bar to snap into engagement with the keepers. The door may be opened by grasping a handle 60 affixed to the midportion of lock bar 46 and pressing downwardly to free said lock bar from keepers 56, then lifting forwardly and upwardly to pivot the door to the dotted line position of FIG. 1.

Each stall is also provided with a rear door indicated generally by the numeral 62. Said rear door is rectangular, having an angle iron frame 64 with rigid, vertically extending slats 66 affixed therein, and is pivoted on top rear frame bar 28 by bearing members 68 affixed to the door frame and journalled on bar 28, collars 70 fixed on said bar preventing axial movement of said bearings along said bar. Said rear door may be locked in the closed position shown in solid lines in FIG. 1 by means of a horizontal lock bar 72 overlying the outer surface of the door adjacent its lower edge. Said lock bar is carried for limited vertical sliding movement in slide loops 74 fixed to door frame 64, and extends laterally from both edges of the door for engagement with keepers 76 fixed to rear frame posts 14, in the same manner that lock bar 46 of the front door is carried in slide loops 48 and engages keepers 46.

Each rear door 62 may be opened, closed, locked or unlocked, by a mechanism including an arm 78 fixed to the midportion of the top leg of door frame 64, and extending outwardly therefrom, normally below the elevation of top rear frame bar 28. Pivoted to the extended end of said arm, as at 80, is a bell crank lever 82, the axis of pivot 80 being parallel to frame bar 28. One leg 84 of said lever extends forwardly toward the door, and a clevis 86 is pivoted to the free end thereof as at 88. A strut 90 of heavy but flexible bar stock is fixed at its upper end to clevis 86, and at its lower end to the midportion of lock bar 72. The other leg 92 of bell crank lever 82 extends upwardly and rearwardly, and its upper end is connected to a link 94 which extends horizontally forwardly over the associated stall and is pivoted at its forward end, as by bolt 96, to the free end of a crank 98 fixed at its opposite end to top front shaft 20 of the frame. Link 94 is provided at its forward end with a downwardly inclined end section 100, which is pivoted to crank 98, and at its rearward end with a downwardly inclined end section 102, which is pivoted to the free end of lever arm 92 at 104. End section 102 has affixed therein a screw 106 (See FIG. 1) which is threaded into a nut 108 fixed in the central portion of the link. By removing front pivot bolt 96, the link may be turned axially to thread nut 108 along screw 106 to adjust the effective length of the link, whereby to insure that all of rear doors 62 will be closed simultaneously despite manufacturing variations, as will appear. Affixed to the free end of one of cranks 98 at the front of the enclosure is an upwardly extending post 110, to the upper end of which there is in turn affixed a handle grip 112 which is parallel to shaft 20.

In use of the device, an operator standing in front of frame 2 first closes and locks all of front doos 34 as previously described, then grasps handle 112 and pulls forwardly and downwardly to turn the crank 98 to which it is affixed, and further, since that crank turns shaft 20 to which the cranks of all of the stalls are affixed, to turn all of said cranks, thereby pulling all of links 94 forwardly. With relation to each stall, the initial portion of the forward movement of its associated link 94 pivots bell crank lever 82 in a clockwise direction as viewed in FIG. 1. During this movement, the lever acts through strut 90 to move lock bar 72 downwardly, thereby freeing it from keepers 76, as shown in FIG. 10. The lock bar then engages the lower ends of slide loops 74, and can move no lower relative to the door. Thereafter, lever 82 is rigidly fixed relative to door 62. Thus, further forward movement of link 94 causes the door to be pivoted rearwardly and upwardly to the dotted line position of FIG. 1. During this door movement, strut 90 is of course supporting a compressive load, but it is of sufficiently great strength to withstand said load. The strut may be further reinforced against flexure by positioning it to overlie one of door slats 66, as shown. When front crank 98 approaches a position corresponding to full opening of rear doors 62, as shown in dotted lines in FIG. 1, front link pivots 96 pass downwardly through a plane determined by the axes of rear link pivots 104 and shaft 20, just before links 94 engage said shaft. This movement of the linkage through a "dead-center" position securely locks the rear doors in their open position. In this connection, it should be noted that while as shown, all of rear doors 62 are unlocked and opened by manipulation of a single handle 112, it would be quite simple to provide each rear door with its own individual operating handle.

The sows are then allowed to enter the stalls from the rear, preferably along a runway providing access from a general pen to the rear of all of the stalls, as previously discussed. When all of the sows are in their stalls, handle 112 is then moved upwardly and rearwardly to close doors 62, the final portion of this movement pivoting bell crank levers 82 in a counter-clockwise direction, as viewed in FIG. 1, to elevate lock bars 72 into engagement with keepers 76 to lock the doors closed. The operator may then pour the feed ration designed for each sow into the outwardly extending portion of the feed bunker 42 of her stall. Each sow is prevented by side walls 8 of her stall from gaining access to the feed bunker 42 of any other stall, and is prevented from climbing over the side walls by angle iron bars 30.

As each sow completes her ration of feed, the human operator may unlock and open front door 34 of her stall by grasping and manipulating handle 60 of the door as previously described, thereby permitting forward egress of the sow from the stall, then allowing the door to close and lock automatically. Preferably, as previously mentioned, egress of the sows is limited to a holding pen divided from the general pen from which they originally entered the stalls, to avoid the possibility that any sow might simply retrace her original path and thereby gain access to another stall. The fact that each feed bunker 42 is permanently affixed to its associated door 34 provides that as each door is opened as described, the bunker is moved out of the sow's path and does not obstruct her egress from the stall.

It should be noted that while FIG. 1 shows both the front and rear doors open, in dotted lines, they actually cannot both be open at the same time, due to interference between each front door 34 and the rear door operating crank 98 associated with that door which would then occur. This is an intentional provision, designed to prevent any sow from moving continuously into, through, and out of a stall without feeding.

While I have shown and described a specific embodiment of my invention, it will be readily apparent that many minor changes of structure and operation could be made without departing from the spirit of the invention.

What I claim as new and desire to protect by Letters Patent is:

1. A sow feeding enclosure comprising:
   a. a frame defining a stall having side walls and being open at both forward and rearward ends,
   b. a feed bunker mounted within said stall,
   c. front and rear doors pivoted on said frame and adapted when in closed positions to obstruct the front and rear openings of said stall respectively,
   d. door locking means operable to lock said doors in their closed positions, and
   e. manually operable door operating means operable to lock, unlock, open and close each of said doors independently of the other, said front door being pivoted to said frame at its upper edge on a horizontal transverse axis, and opening outwardly and upwardly said locking and operating means for said front door comprising a horizontally extended lock bar carried for vertical movement by said front door, and projecting laterally from said door to engage said frame to limit closure of said door, keepers fixed to said frame and engageable with said lock bar to lock said door closed, said lock bar being engageable and disengageable from said keepers by vertical movement of said lock bar relative to said door, spring means biasing said lock bar vertically relative to said door to engage said keepers, and a handle affixed to said lock bar, whereby said lock bar may be disengaged from said keepers by vertical pressure on said handlle, and said door opened by pulling outwardly on said handle.

2. A device as recited in claim 1 wherein said front door extends adjacent the bottom of said stall, and wherein said feed bunker opens upwardly and is affixed to the lower portion of said door.

3. A device as recited in claim 2 wherein the open top of said feed bunker projects both inwardly and outwardly from the plane of said front door.

4. A sow feeding enclosure comprising:
   a. a frame defining a stall having side walls and being open at both forward and rearward ends,
   b. a feed bunker mounted within said stall,
   c. front and rear doors pivoted on said frame and adapted when in closed positions to obstruct the front and rear openings of said stall respectively,
   d. door locking means operable to lock said doors in their closed positions, and
   e. manually operable door operating means operable to lock, unlock, open and close each of said doors independently of the other, said rear door being pivoted to said frame at its upper edge on a horizontal transverse axis, and opening outwardly and upwardly, said locking and operating means for said rear door comprising a horizontally extending lock bar carried for limited vertical movement by said rear door, and projecting laterally from said door to engage said frame to limit closure of said door, keepers affixed to said frame and engageable with the laterally extending portions of said lock bar to lock said door closed, said lock bar being engageable with said keepers by movement thereof to its upper limit, and disengageable therefrom by movement thereof to its lower limit, an outwardly projecting arm affixed to the upper portion of said door, above said lock bar, a bell crank lever pivoted to the free end of said arm on an axis parallel to the pivotal axis of the door, and having forwardly and upwardly projecting legs, a strut interconnecting the free end of the forwardly exteveling leg of said lever to said lock bar, a crank pivoted on said frame at the forward end of said stall on an axis parallel to the pivotal axis of said rear door, and extending upwardly, a link interconnecting the upper end of said crank and the upwardly extending leg of said bell crank lever, and manual means for turning said crank, whereby during initial forward movement of said crank, said link pivots said bell crank lever to act through said strut to disengage said lock bar from said keepers, and whereby during continued forward movement of said crank, said rear door is pivoted to its open position.

5. A device as recited in claim 4 wherein, as said crank approaches a position representing a full open position of said rear door, the axis of its pivotal connection to said link moves through and past a plane defined by the pivotal axis of said crank and the axis of the pivotal connection of said link to said bell crank lever, and said link then abuts said frame, whereby said rear door is locked in its open position.

* * * * *